United States Patent [19]

Netto

[11] Patent Number: 5,600,978
[45] Date of Patent: Feb. 11, 1997

[54] DEVICE FOR THE CLOSURE OF BAGS OR THE LIKE AND SECURITY SEAL

[75] Inventor: Eduardo D. C. Netto, Rio de Janeiro, Brazil

[73] Assignee: ELC Produtos de Seguranca e Comercio Ltda., Rio de Janeiro, Brazil

[21] Appl. No.: 307,807
[22] PCT Filed: Mar. 30, 1993
[86] PCT No.: PCT/BR93/00011
§ 371 Date: Sep. 28, 1994
§ 102(e) Date: Sep. 28, 1994
[87] PCT Pub. No.: WO93/19992
PCT Pub. Date: Oct. 14, 1993

[30] Foreign Application Priority Data

Mar. 31, 1992 [BR] Brazil ..................... 9201123

[51] Int. Cl.⁶ ............... A45C 13/10; E05B 65/52
[52] U.S. Cl. .................. 70/64; 70/65; 383/79; 383/92
[58] Field of Search .......... 383/79, 92; 70/63–65, 70/70, 71; 292/DIG. 20, DIG. 33, DIG. 35, DIG. 46, DIG. 47, DIG. 50; 24/30.5 R

[56] References Cited

U.S. PATENT DOCUMENTS

| 428,387 | 5/1890 | Enholm | 70/64 |
| 829,087 | 8/1906 | Rice | 70/65 |
| 1,155,375 | 10/1915 | Shannon . | |
| 2,843,309 | 7/1958 | Wheeler | 383/5 |
| 3,727,829 | 4/1973 | Huni | 383/86 X |
| 4,042,267 | 8/1977 | Clinch et al. | 24/30.5 R X |

FOREIGN PATENT DOCUMENTS

| 708353 | 4/1965 | Canada | 70/65 |

Primary Examiner—Lloyd A. Gall
Assistant Examiner—Tuyet-Phuong Pham
Attorney, Agent, or Firm—Beveridge, DeGrandi, Weilacher & Young, L.L.P.

[57] ABSTRACT

A re-usable device for closing bags and the like, which may be sealed in a locked configuration by applying a security seal (24). The device (1) comprises two elongate parts (2, 3) the may be superimposed on each other, The first part (2), which is attached along one side of the mouth of a bag to be closed, is provided with a series of locking pins (6, 6') that—on closing the bag—pass into corresponding orifices (9) in the second part the which is attached along an opposite side of the mouth of the bag. The device is locked in this bag closed configuration by means of locking elements (13, 13') that slide longitudinally along internal passages (8, 8') in the second part until the reach a position where they lock the locking pins (6, 6'). The locking elements (13, 13') may be sealed in such configuration by applying a security seal (24).

21 Claims, 6 Drawing Sheets

DEVICE FOR THE CLOSURE OF BAGS OR THE LIKE AND SECURITY SEAL

BACKGROUND

The present invention refers to a device for the closure of bags and the like, as well as to a security seal usable with the device.

U.S. Pat. No. 4,983,047 (Brazilian patent application PI 8903982 of 08.08.89) discloses a security envelope suitable for the transport of confidential documents or money. The envelope is provided with a closure and seal device that comprises a first elongate part having a series of locking pins distributed along its length, a second elongate part integral with and foldable over the first part to assume a closed configuration with the pins penetrating a series of orifices in the second part, the mouth of the envelope being held between the first and second parts in the closed configuration with the pins passing through it. In U.S. Pat. No. 4,983,047, each orifice in the second part of the device comprises a locking cavity and each pin in the first part has a head cooperable with a respective cavity. In other words, the device incorporates as many security seals as there are locking pins. When the bag has to be opened, it is sufficient to cut the other end of the envelope with a pair of scissors or the like to permit removal of the contents without interfering with the closure device the inviolability of which can later be checked should a document or money be missing.

Although the closure device of U.S. Pat. No. 4,983,047 is very suitable for its intended use and has been well received on the market due to its simplicity of use and to the high degree of security that it offers, both the envelope and the device are disposable. Consequently, the device cannot be used for bags and the like that are designed for repeated use.

The present invention refers therefore to a device of the above general type, but with the purpose of providing a new device that may be used many times without compromising the degree of security obtained.

SUMMARY

According to the present invention, a device for the closure of bags or the like, comprises a first elongate part provided with a series of pins distributed along its length, a second elongate part cooperable in face to face relation with the first elongate part and having a series of orifices distributed along its length to receive the locking pins in a closed configuration and locking means for locking the first and second parts in the closed configuration. The locking means comprise:

(i) a longitudinal passage formed along the second part;

(ii) an elongate locking element housed in such passage and shiftable longitudinally therein between a first free position in which the respective pins can fully penetrate the orifices in the second part, and a second locked position in which the pins are locked in the orifices; and (iii) means permitting the immobilisation of the locking element in the second locked position by the application of a security seal.

With a device according to the present invention, instead of sealing the free end or head of each pin in the respective orifice in the second part, the locking element is manually shifted to a position wherein each pin is locked to prevent opening of the device (and consequently to maintain the bag positively closed) and thereafter the locking element may be sealed in such position by means of a single security seal which is destroyed to permit its unlocking and the opening of the bag which will then be re-usable.

Preferably, the locking element is formed to leave the above mentioned orifices in the second part substantially unobstructed when in the first position mentioned and partially obstructed when in the second locked position. The locking element may further be formed with elastically deformable regions to interfere slightly with the passage of the pins into the orifices in the second part, so as to retain the pins elastically therein until the locking element is shifted to the second locked position.

In the preferred embodiments of the closure device, as will be described later in detail with reference to the drawings, the passage for the locking element is formed internally in the second part.

Further in the preferred embodiments, the locking element comprises a strip formed therealong with a series of openings, each opening having a first region of a width corresponding substantially to that of the free end of each pin, and a second region of a reduced width corresponding substantially to that of a reduced width region behind the free end of each pin. The first region has a width slightly less than that of the free end of each pin and the strip is formed with a slot adjacent and parallel to at least one side edge of the first region. This makes the edge elastically deformable so as to define one of the above mentioned elastically deformable regions.

With respect to the sealing system for locking the locking element in its second position, the element is formed with a handling tab extended out of the plane of the second part, the second part being provided with a locking cavity to receive a security seal locking portion, adjacent the tab.

The security seal preferably comprises a base formed with an opening suitable to be penetrated by the handling tab when the locking element is in the mentioned second locked position, the base further having a locking part in the form of a pin for insertion in the locking cavity.

The locking element may further be formed with a recess adjacent the tab and the base of the seal is formed with a protuberance that cooperates with the recess when the seal is applied.

In the preferred embodiments of the invention, there are two locking elements aligned with each other and housed in respective passages in the second part, each of the adjacent ends of the two locking elements having a tab turned outwardly from the plane of the second part. In this case, the base of the seal is formed with a second opening parallel to the first opening mentioned, to receive the tab of the second locking element, the locking pin being positioned between the first and second openings.

BRIEF DESCRIPTION OF THE DRAWINGS

The present invention will be better understood from the following description, given by way of example, reference being made to the accompanying drawings, in which.

DETAILED DESCRIPTION

Referring now to FIGS. 1 to 6 of the drawings which show a bag closure device and a security seal for use therewith, all in accordance with a first preferred embodiment of the invention, the closure device 1 comprises first and second elongate rectangular parts 2 and 3 joined to each other by a thinner hinge line 4. The device 1 is moulded in plastics material as a single piece, parts 2 and 3 being formed with windows 5 for the simple reason of reducing the amount of material used in its manufacture.

Figure 1:
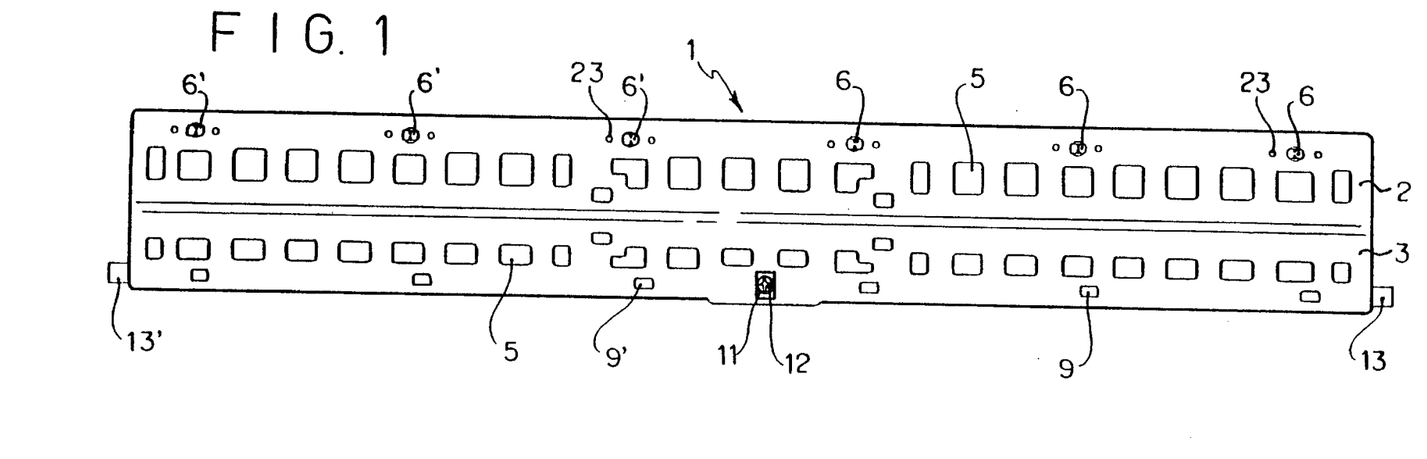
FIG. 1 is a lower plan view of a closure device constructed in accordance with a first preferred embodiment of the invention.

The inner surface of part 2, that is to say, the surface facing part 3 when the two parts are folded over each other along hinge line 4 to assume a closed configuration, is formed with six locking pins 6 and 6' distributed along its length. Each locking pin 6 and 6' is substantially cylindrical and is formed, adjacent its free end, with a pair of transverse recesses 7, one on each side of the pin, to define a reduced thickness region.

Figure 2:
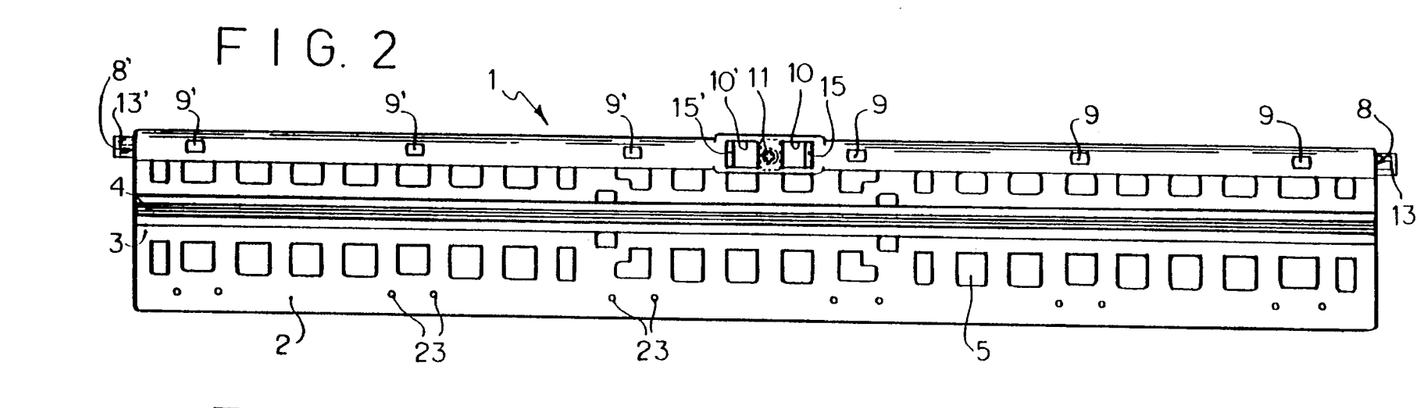
FIG. 2 is a top plan view of the same closure device.

The second part 3 of the closure device, in the region of its longitudinal edge opposite that of hinge line 4, is thickened, such thickened part being formed with two aligned passages 8 and 8'. The thickened part is further formed with openings 9 and 9' that pass through the respective passages 8 and 8' and, in their turn, receive the respective pins 6 and 6' when device 1 is folded to assume its closed configuration.

In an almost central region of the thickened part, there are two rectangular openings 10 and 10' in the outer surface (with respect to the closed configuration of the device), which open into the interior of the respective passages or tunnels 8 and 8' and have widths substantially identical to the widths of the latter Between openings 10 and 10', there is an orifice that passes through part 3 and contains a locking cavity for a security seal, cavity 11 being formed with four locking teeth 12. Preferably, cavity 11 comprises an insert that is incorporated in device 1 when it is injection moulded.

Device 1 further comprises two locking elements 13 and 13' (shown in detail in FIG. 3) that are housed in the respective passages 8 and 8'. The two elements 13 and 13' are almost identical, element 13 being slightly shorter, for which reason only element 13 will be described in detail, the characteristics of element 13' being indicated in the drawings with the same reference number followed by an apostrophe. Thus, element 13 comprises a strip 14 formed at one end with a tab 15 normal to its substantially planar surface. Distributed along the length of strip 14 there are three openings 16 interspaced by amounts corresponding to the distances between openings 9 in part 3 of device 1. Each opening 16 has a first rectangular region 17 of a width slightly less than the normal width of pins 6. Adjacent to and along the two side edges of first region 17 of opening 16, there are respective narrow slots 18 to confer a certain elasticity to such side edges. Thus, the free end of a pin 6 can be forced through the first region 17 of opening 16 due to the elastic deformation of such side edges.

Figure 3:
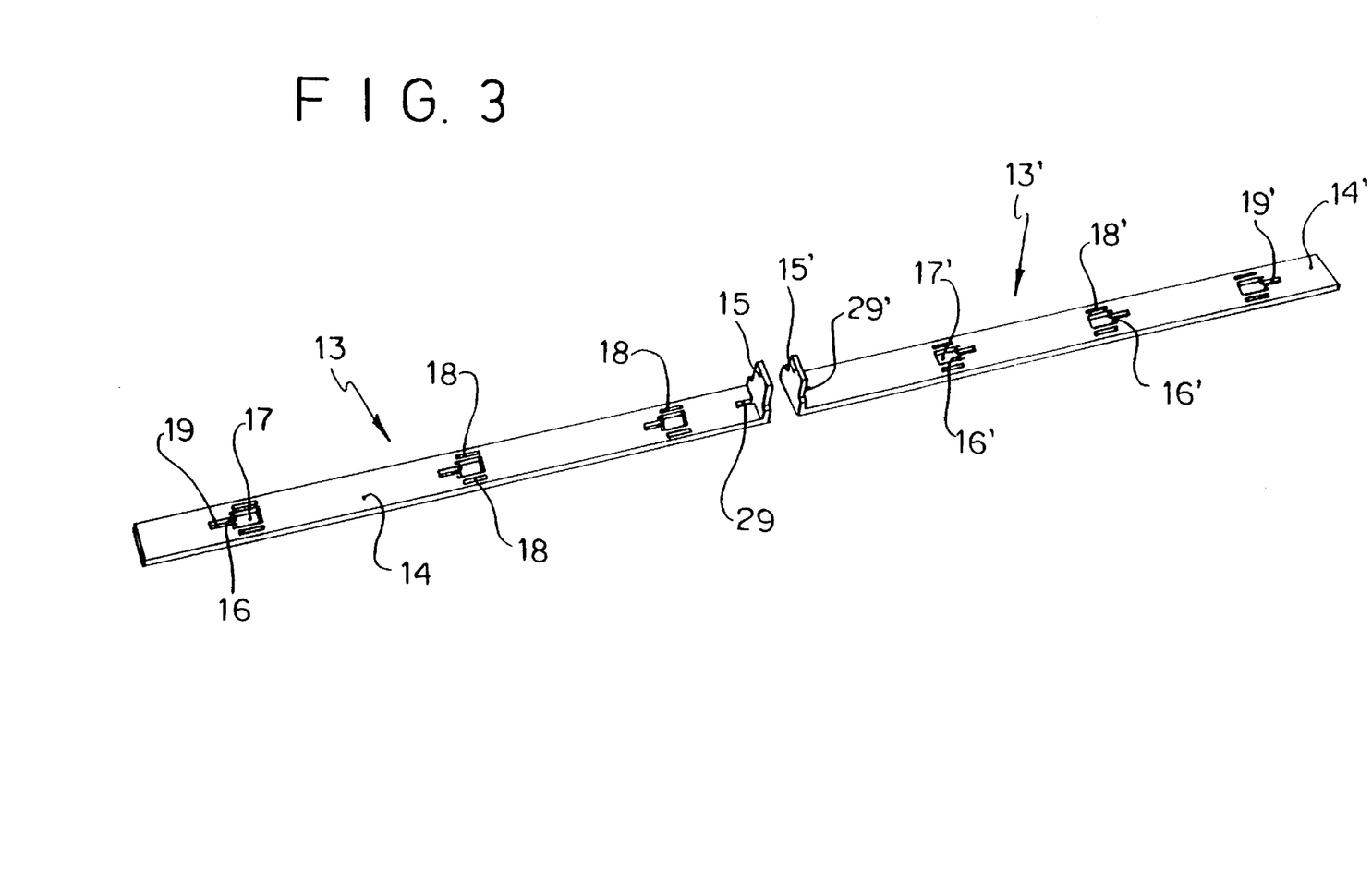
FIG. 3 is a perspective view of two locking elements that are components of the device shown in FIGS. 1 and 2.

Each opening 16 also has, in longitudinal continuation from the first region 17, a second rectangular region 19 having a width substantially the same as the reduced width of pin 6 corresponding to recesses 7.

When strips 14 and 14' are introduced into passages 8 and 8' through openings 10 and 10' tabs 15 and 15' project outwardly from such openings (see FIGS. 2 and 5) and can be actuated manually to shift or slide the locking elements 13 and 13' in longitudinal reciprocation limited by the longitudinal dimensions of openings 10 and 10'. The lengths of strips 14 and 14' and the positioning of openings 16 and 16' are such that such shifting permits openings 9 and 9' of the second part 3 of device 1 to enter into registry with the first rectangular regions 17 and 17' of openings 16 and 16', in a first end position of the strips, and with the second narrower rectangular regions 19 and 19' in the other end position of the strips. As can be seen from the drawings, the first position is when tabs 15 and 15' are fully separated and the other position—the locking position—is when the tabs are closest to each other.

Figure 4:
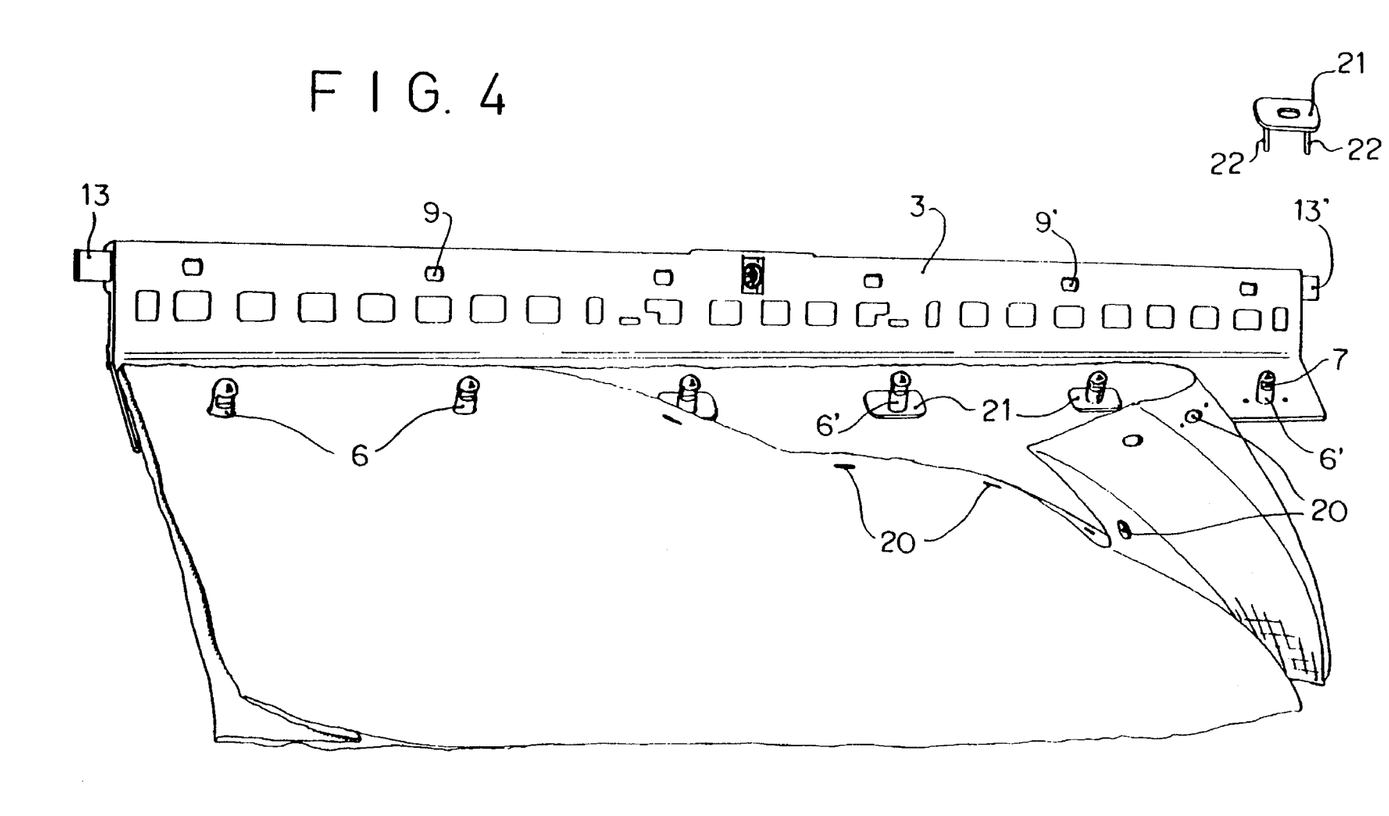
FIG. 4 is a perspective view of the same closure device on being applied to a bag, the figure further showing a detail of a retainer used for mounting the device on the bag.

FIG. 4 shows how the device is permanently mounted on the mouth of a bag. The edge of the opening or mouth of the bag is formed with a series of orifices 20 for passage of pins 6 and 6' and the six pins are passed through six of such orifices. Small plastic retainers 21 are then placed over the pins and against the inner surface of the mouth of the bag and welded or riveted to part 2 of device 1 by means of pairs of small pins 22 that pass through pairs of small orifices 23 in part 2, one on each side of each pin 6 and 6'.

In order to close the bag after documents or the like are placed in its interior, its mouth is folded as shown in FIG. 4 and the respective orifices 20 are placed over pins 6 and 6'. Thereafter, with the locking elements 13 and 13' in their first position and consequently with tabs 15 and 15' separated from each other, part 3 of device 1 is folded over part 2 until the pins pass through openings 9 and 9' and, under pressure, through the first wider regions 17 and 17' of openings 16 and 16' in the locking elements. Once part 3 is firmly closed over part 2 with pins 6 and 6' correctly fitted, tabs 15 and 15' are pushed towards each other to shift locking elements 13 and 13' to their second locked positions where the reduced width regions of pins 6 and 6' (in recesses 7) are received in the second reduced width regions 19 and 19' of openings 16 and 16'. In this configuration (shown in FIG. 5), the bag is firmly closed, but not yet sealed.

Figure 5:
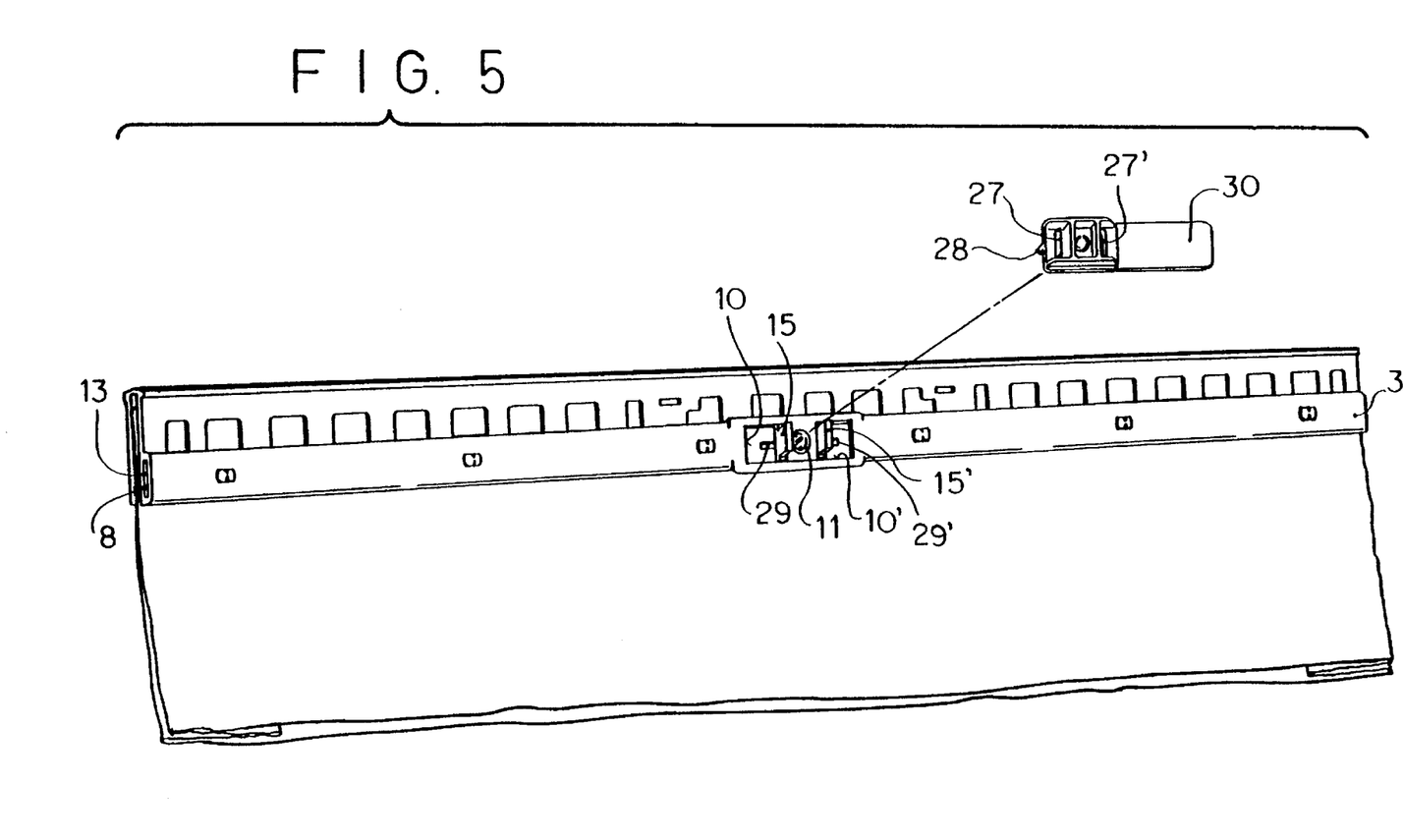
FIG. 5 is a perspective view showing the same bag in a configuration in which it is locked, but not yet sealed, by means of the device of FIGS. 1 and 2, the figure also showing an upper perspective of a security seal to be used with the device.
Figure 6A:
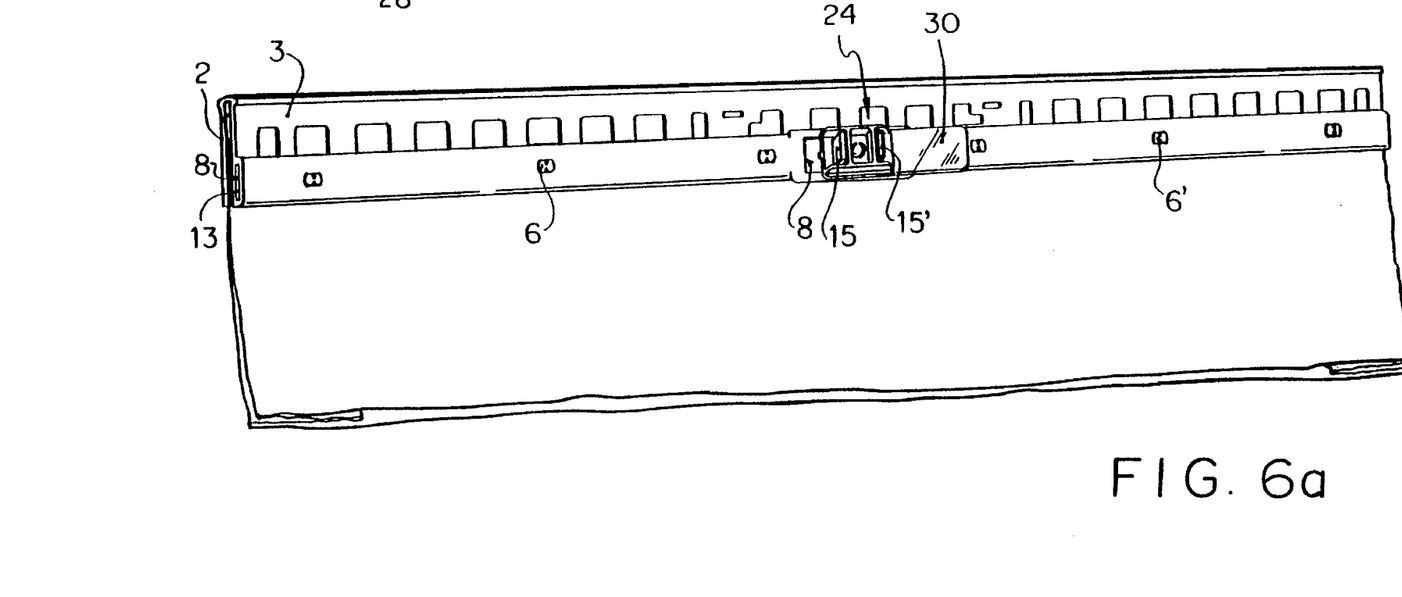
FIG. 6 is a perspective view showing the same bag in a configuration in which it is locked and sealed by the security seal, the figure also showing the security seal in lower perspective.
Figure 6B:
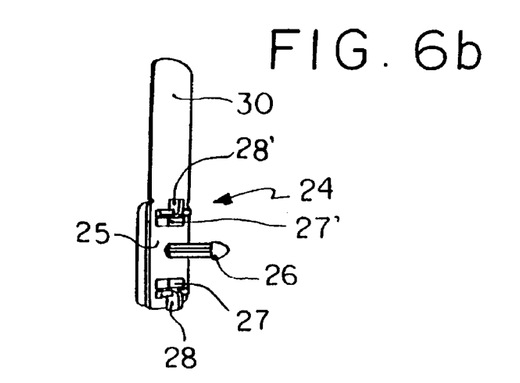

To seal the closed bag it is sufficient to use the security seal 24 shown in FIGS. 5 and 6. The seal 24 comprises a substantially rectangular base 25 having a locking pin 26 with locking formations, that could be similar to the pin illustrated in FIG. 4 of above mentioned U.S. Pat. No. 4,983,047 (Brazilian application PI 8903982) except for the fact that pin 26 is frangibly attached to base 25. On each side of locking pin 26 there is a rectangular opening 27 or 27' through which tab 15 or 15' of the respective locking element may pass. Base 25 is further formed with two small protuberances 28 and 28' externally of openings 27 and 27', for fitment into corresponding recesses 29 and 29' in the ends of strips 14 and 14' adjacent tabs 15 and 15'. Seal 24 is also formed with a lateral blade 30 for receiving a number or any other indication to individualise the seal and thus guarantee the the bag cannot be opened and then re-closed using another seal.

When the security seal 24 is applied, the locking pin 26 is inserted into the receiving cavity 11 in a manner such that openings 27 and 27' receive the tabs 15 and 15' and base 25 is forced downwardly to cause the locking teeth 12 to engage the locking formations on pin 26. In this sealed configuration, tabs 15 and 15' pass through openings 27 and 27' and protuberances 28 and 28' fit into recesses 29 and 29', ensuring in this way a positive block against shifting of the locking elements. Blade 30 in this configuration is superimposed on the outer surface of part 3 of device 1 in a clearly visible position and without any tendency to be caught on the clothes of the person handling the bag or the like, as shown in FIG. 6.

To open the bag, it is only necessary to grasp blade 30 and pull it out of its own plane, thus breaking the frangible connection between locking pin 26 and base 25 of the seal. Once the seal is removed, the tabs on the locking elements may be forced away from each other so as to move such elements to their first position and thus permit opening of the device and consequently of the bag. The broken pin 26 can then be removed and the bag and device 1 are ready to be used again.

Figure 7:
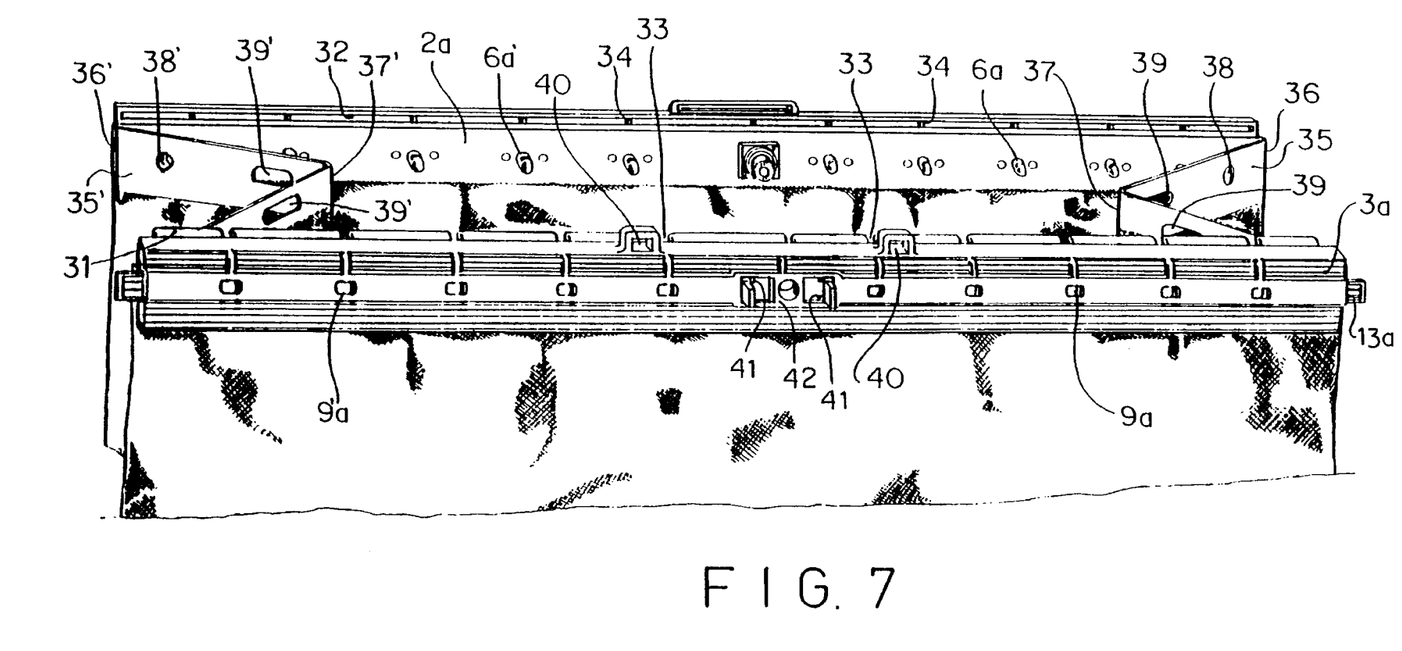
FIG. 7 is an upper perspective view of a second and presently more preferred embodiment of the closure device of the present invention.

FIG. 7 shows a second and presently more preferred embodiment of the present invention in which, although essentially the same as that described above, the two parts 2a and 3a of a closure device 1a comprise separate parts that are not joined by a hinge line. Instead there is a longitudinal flange 31 along the top edge of part 3a, normal to the general plane of the latter. Part 2a is formed with a corresponding longitudinal groove 32 so that when part 2a is placed over part 3a, flange 31 fits into groove 32 to prevent access to the interior of a bag between the first and second parts 2a and 3a when the device is closed.

In addition, so as to prevent relative longitudinal movements between parts 2a and 3a, the flange is formed with a series of spaced cut-outs 33 distributed along its length, into which a series of corresponding transverse ribs 34 formed within groove 32 fit when the device is closed.

It will also be observed that corresponding ends of parts 2a and 3a are joined to each other by thinner more flexible sections 35 and 35' that are foldable along end hinge lines 36 and 36' and intermediate hinge lines 37 and 37'. Sections 35 and 35' each have a pair of substantially circular orifices 38 or 38', one adjacent each of its ends and a pair of elongate orifices 39 or 39', one on each side of the intermediate hinge line 37 or 37'. With this construction, when the two parts 2a and 3a are closed against each other, flexible sections 35 and 35' fold inwardly in bellows fashion and the first pair of locking pins 6a and 6a' adjacent the ends of part 2a pass through the respective orifices 38, 38' and 39, 39' before entering their respective orifices 9a and 9a' on part 3a.

In this particular case, instead of the bag being fixed to the closure device by pins 6 and 6' passing through corresponding orifices in the bag and then rivets being applied, the bag may be permanently fixed to device 1a by plastic welding directly to parts 2a and 3a and to sections 35 and 35' along a region below pins 6a and 6a' and the corresponding orifices 9a, 9a', 38, 38', 39 and 39'. In this respect it will be noted that the total extension of the periphery of the mouth of the bag is equal to the sum of the lengths of parts 2a and 3a and sections 35 and 35'.

The second embodiment of the invention just described is preferred to the first in that closure of the bag is simplified by the whole mouth of the bag being reinforced by the device 1a attached all around the periphery of its mouth. In addition, when the bag is open, it is easier to place documents or the like in the bag or to withdraw the contents.

It will also be noted that part 3a is formed with openings 40 that permit the attachment of a handle to facilitate transport.

Finally with respect to the FIG. 7 embodiment, it will be noted that the inner ends of each of the two strips 13a and 13a' is provided with a pair of short pin-like extensions 41. These extensions serve further to increase the security of the device in that, in the closed configuration corresponding to that shown in FIG. 5, they penetrate the central space under portion 42 and thus ensure that the corresponding ends of strips 13a and 13a' cannot be lifted outwardly.

It will be understood that the invention has been described with specific reference to two presently preferred embodiments, but that both the closure device and the security seal can have other configurations provided that they fall within the basic concept of the invention. For example, among the many that could occur to a person versed in the art, the following modifications should be considered as within the spirit of the inventive concept:

a) the mouth of the bag does not have to be fixed to the device 1;

b) there could be only one locking element, in which case the security seal would have only one of the openings 27 and 27' and the locking element would have the total length of the device;

c) tabs 15 and 15' do not have to be formed at the ends of strips 14 and 14' especially in case b) above when the single tab could be central;

d) instead of openings 16 and 16' the locking elements could be formed with lateral hooks. In such a case, openings 9 and 9' in part 3 of the device would not necessarily coincide with passages 8 and 8' but could be formed in regions laterally offset from the passages;

e) although preferably substantially in the form of tunnels closed along the greater part of their lengths, passages 8 and 8' could comprise rails or the like for the locking elements provided that it would not be possible to remove the locking elements from part 3 in the sealed position; and f) the security seal 24, the receiving cavity and the tabs 14 and 14' could have other shapes and even use different types of sealing system provided blocking of the locking elements is guaranteed.

These and other modifications are considered as being within the basic concept of the invention the scope of which should be limited only by that of the following claims.

We claim:

1. Device for the closure of bags, comprising:

(i) a first elongate part having an outer surface and an inner surface;

(ii) a series of pins distributed along and upstanding from said inner surface of said first elongate part;

(iii) a second elongate part having an inner surface, said inner surface of said second elongate part being cooperable in face-to-face relation with said inner surface of said first elongate part;

(iv) a longitudinal passage formed in said second elongate part, said passage being confined in all transverse directions;

(v) a series of orifices through said inner surface of said second elongate part, said orifices being distributed along said second elongate part and opening into said passage;

(vi) an elongate locking element housed in said passage and shiftable longitudinally therein between a first free position in which the respective said pins can penetrate the orifices in said second part to enter said passage, and a second locked position in which said pins are locked in said orifices in said second elongate part; and (vii) means for permitting immobilization of said locking element in said second locking position.

2. Device according to claim 1, in which said locking element is shaped to leave said orifices in said second part substantially unobstructed when in said first position and partially obstructed when in said second locking position.

3. Device according to claim 2, in which said locking element is formed with elastically deformable regions to interfere slightly in the first position with the passage of said pins into the orifices in said second part, thereby elastically retaining the pins in the orifices until said locking element is shifted to said second locking position.

4. Device according to claim 2, in which said locking element comprises a strip formed therealong with a series of openings, each said opening having a first region of a width corresponding substantially to that of the free end of each said pin, and a second region of a reduced width corresponding substantially to that of a reduced width region behind said free end of each said pin.

5. Device according to claim 4, in which said first region has a width slightly less than that of the free end of each said pin and said strip is formed with a slot adjacent and parallel to at least one side edge of said first region.

6. Device according to claim 1, in which said passage is formed internally in said second part.

7. Device according to claim 1, in which said locking element is formed with an operating tab projecting outwardly from the plane of said second part and said second part is provided with a locking cavity to receive a locking portion of a security seal, adjacent said tab.

8. Device according to claim 7, including a second combined passage in said second part, aligned with said first mentioned passage), and a second elongate locking element housed in said second passage.

9. Device according to claim 8, in which said second locking element is formed with a second operating tab projecting outwardly from the plane of said second part, said locking cavity being positioned between said first and second tabs.

10. In combination with the device according to claim 9, a security seal comprising a base formed with first and second openings dimensioned for said first and second operating tabs of said device respectively to pass therethrough when said locking elements of said device are in their second locking positions, said base further comprising a pin-like locking portion for insertion into said locking cavity of said device, said pin-like locking portion being located between said first and second openings.

11. Combination according to claim 10, in which said base is further formed with two protuberances respectively adjacent said first and second openings and protruding from the same side of the base as said pin-like locking portion.

12. In combination with the device according to claim 7, a security seal comprising a base formed with an opening dimensioned for said operating tab of said device to pass therethrough when said locking element of said device is in its second locking position, said base further comprising a pin-like locking portion for insertion into said locking cavity of said device.

13. Combination according to claim 12, in which said base of said seal is further formed with a protuberance adjacent said opening and protruding from the same side of the base as said pin-like locking portion.

14. Combination according to claim 12, in which said base of said seal is formed with a second opening identical to said first mentioned opening, said pin-like locking portion being located between said first and second openings.

15. Combination according to claim 14, in which said base of said seal is further formed with two protuberances respectively adjacent said first and second openings and protruding from the same side of the base as said pin-like locking portion.

16. Combination according to claim 12, in which said pin-like locking portion of said seal is frangibly connected to said base.

17. Device according to claim 1, in which said first and second parts comprise a single piece with said parts hinged longitudinally to each other along a hinge line whereby they may be folded over each other to reach said closed configuration.

18. Device according to claim 1, in which said first and second parts are formed with cooperating formations along corresponding longitudinal edges whereby, when said parts are placed in face to face relation to assume said closed configuration, said formations prevent access between said first and second part from said longitudinal edges.

19. Device according to claim 18, in which said formations comprise a longitudinal groove and a longitudinal flange receivable in said groove.

20. Device according to claim 18, in which corresponding ends of said first and second parts are joined to each other by foldable portions that fold inwardly in bellows fashion between said first and second parts when said parts assume said closed configuration.

21. Device according to claim 20, in which said foldable portions are formed with orifices that are penetrated by respective ones of said locking pins in said closed configuration.

\* \* \* \* \*

UNITED STATES PATENT AND TRADEMARK OFFICE
CERTIFICATE OF CORRECTION

PATENT NO. : 5,600,978
DATED : February 11, 1997
INVENTOR(S) : Eduardo de Lima Castro Netto It is certified that error appears in the above-indentified patent and that said Letters Patent is hereby corrected as shown below:

Title page, item [75], the inventor's name should read:

--Eduardo de Lima Castro Netto--

Signed and Sealed this

Sixth Day of May, 1997

*Attest:*

BRUCE LEHMAN

*Attesting Officer*  *Commissioner of Patents and Trademarks*